R-185 AU 353 EX Examiner
IP8006 OR RE 15,798

BEST AVAILABLE COPY 1,366,100

March 18, 1924. Re. 15,798

A. E. RHOADES

TENSION MECHANISM FOR TEXTILE AND OTHER MACHINES

Original Filed March 8, 1920 2 Sheets-Sheet 1

Speed controller
Keeps surface speed of beam constant
Speed adj

Inventor.
Alonzo E. Rhoades
by Heard Smith & Tennant
Attys.

March 18, 1924.

A. E. RHOADES

Re. 15,798

TENSION MECHANISM FOR TEXTILE AND OTHER MACHINES

Original Filed March 8, 1920 2 Sheets-Sheet 2

Inventor.
Alonzo E. Rhoades
by Heard Smith & Tennant.
Attys.

Examiner

Reissued Mar. 18, 1924. Re. 15,798

UNITED STATES PATENT OFFICE.

ALONZO E. RHOADES, OF HOPEDALE, MASSACHUSETTS, ASSIGNOR TO DRAPER CORPORATION, OF HOPEDALE, MASSACHUSETTS, A CORPORATION OF MAINE.

TENSION MECHANISM FOR TEXTILE AND OTHER MACHINES.

Original No. 1,366,100, dated January 18, 1921, Serial No. 364,064, filed March 8, 1920. Application for reissue filed December 4, 1923. Serial No. 678,535.

*To all whom it may concern:*

Be it known that I, ALONZO E. RHOADES, a citizen of the United States, and resident of Hopedale, county of Worcester, State of Massachusetts, have invented an Improvement in Tension Mechanisms for Textile and Other Machines, of which the following description, in connection with the accompanying drawing, is a specification, like characters on the drawing representing like parts.

This invention relates to improvements in tension mechanisms for textile and other machines in which a yarn, or a series of yarns, or a sheet of material, is drawn from a source by a rotatable drawing instrumentality and the object of the invention is to provide means for maintaining a constant tension upon the material at the point or points at which it engages the drawing instrumentality.

The invention is disclosed herein as applied to a warp beaming machine and more specifically the object of the invention is to provide means for maintaining a constant and predetermined tension upon the warp which is wrapped upon the beam whereby uniformity in beaming of the warp may be insured.

It is well known that some yarns will stretch more than others and that a machine which is designed for winding one kind of yarn upon the beam at a predetermined degree of tension cannot be used to wind another kind of yarn having a different stretch, upon the beam with the same tension, without variation in the mechanism for driving the beam. This is usually accomplished by changing the ratio of gears which transmit motion from the driving shaft to the warp beam. Furthermore, where heavy yarns are wound the weight of the yarn running from the creel to the beam is often such as to maintain an undesirable tension which will cause the beam to be wound too tightly.

The present invention contemplates the provision of a controller which will act upon the yarn in advance of the warp beam to draw the yarn from the creels at a desirable rate of speed thereby making it unnecessary for the entire drawing of the warp from the creel to be imposed upon the warp beam.

A further object of the invention is to provide means which are automatically operable by the tension upon the yarn to maintain a constant tension upon the yarn as it is wound upon the warp beam. This is accomplished by providing differential gearing, preferably the epicyclic type, which will cause the actuation of the controller to vary in response to the requirements imposed upon it by yarns having different stretch, a portion of the power which is transmitted to the controller being absorbed by a braking mechanism in case yarns of less stretch are being wound. By reason of this construction the adjustment of the braking mechanism, and consequently of the power absorbed by it, enables the machine to be adapted without other modification for winding various kinds of warps. In each case the adjustment may be such as to cause the warp to be wound upon the warp beam with a constant predetermined tension.

In its broader aspect the invention contemplates the application to a machine, having means for drawing a strand of yarn or a sheet of yarn or other material, of a driven tension controlling mechanism having regulating means operable by the variations in tension of the strand or sheet which will cause the tension controlling means to be driven at a rate of speed which will maintain a constant tension upon the strand or sheet at the point or points at which it engages the drawing mechanism.

Thus the present invention is adapted not only for use in warp beaming and other yarn winding machines, but also in machines in which it is desirable to feed a strand or web of material, under constant tension, to a mechanism for treating the material while under such tension.

A further object of the invention is to provide a machine of the character described with means whereby any desirable predetermined tension may be imposed upon the strand or sheet.

Other objects and features of the invention will more fully appear from the following description and the accompanying drawings and will be pointed out in the annexed claims.

A preferred embodiment of the invention is disclosed herein as applied to a warp beaming machine.

Figure 1:
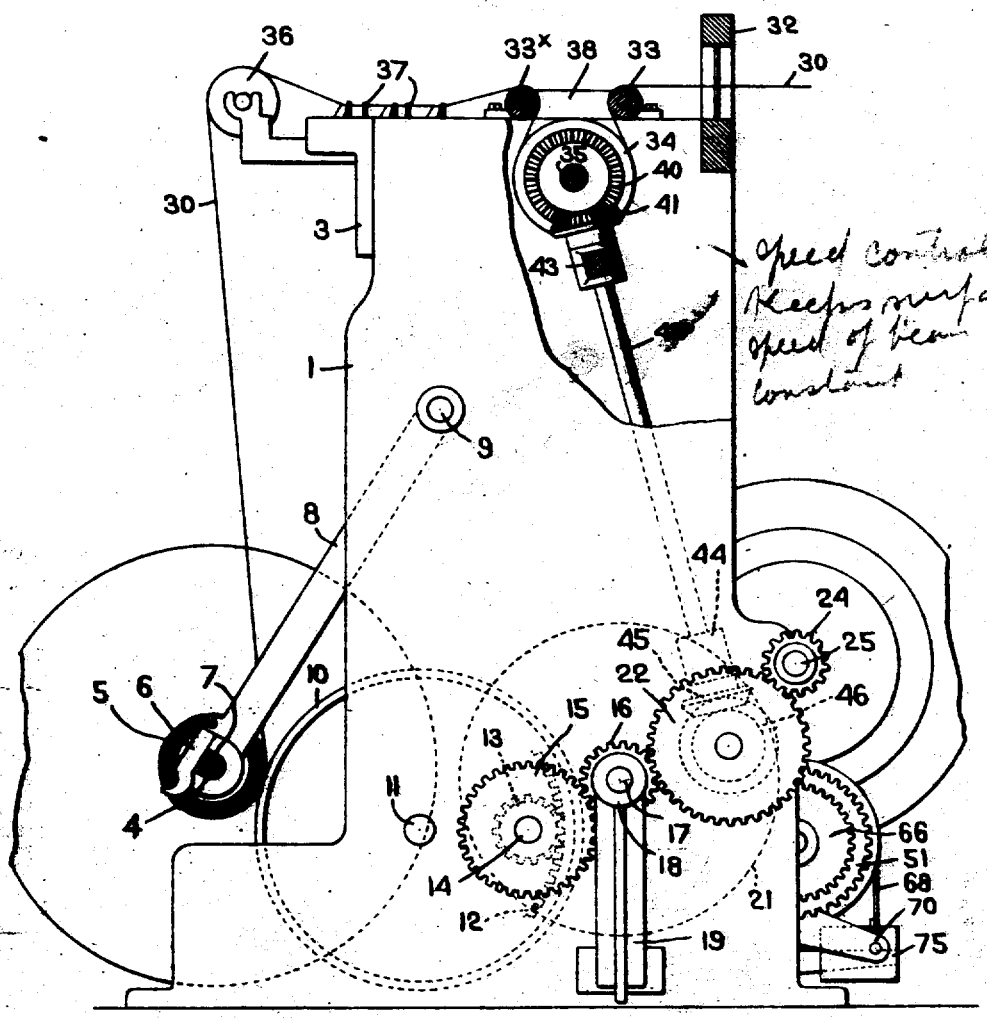
Figure 1 is a side elevation having broken away sections and showing in part diagrammatically the end of a warp beaming machine embodying my invention.
Figure 2:
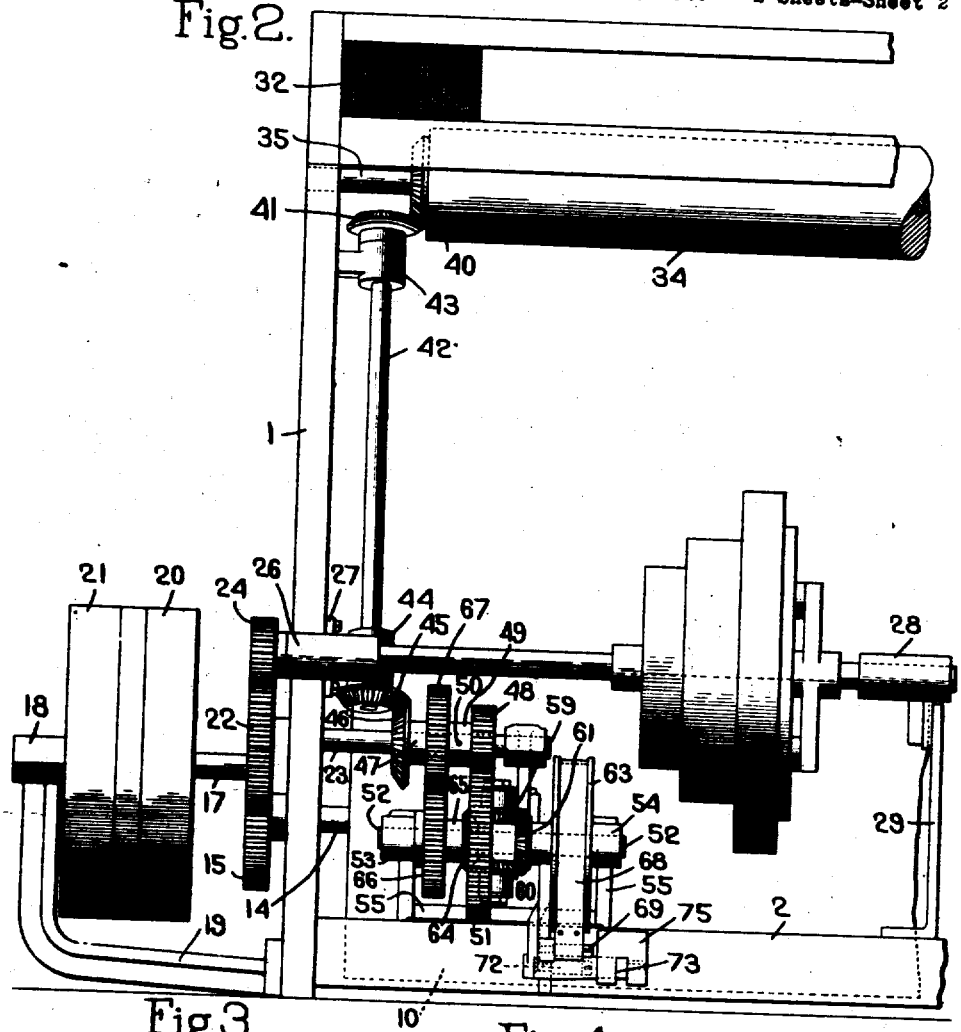
Figure 2 is a rear view of a sufficient portion of a warp beaming machine to illustrate the preferred embodiment of my invention applied thereto.
Figure 3:
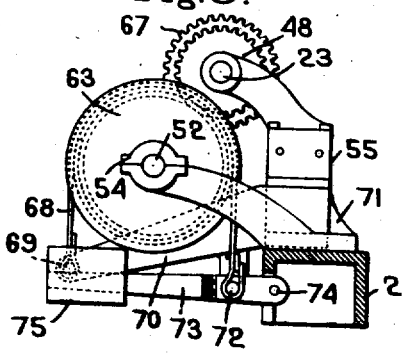
Figure 3 is an end view, partly in section, showing the braking mechanism for regulating the action of the mechanism for rotating the tension controller, and, Figure 4 is a detail view of a portion of the epicyclic train of gearing embodying my invention.
Figure 4:
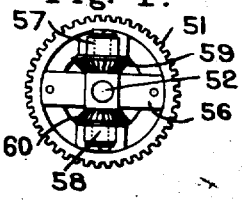

The beaming machine illustrated in the accompanying drawing, which contains a preferred embodiment of my invention, comprises the usual frame having sides 1 connected by a lower girder 2 and having at their upper ends a bracket 3 supporting the usual drop wires, front comb and a carrier roll. The shaft 4 of the warp beam 5 is locked by a latch 6 in suitable sockets 7 in the end portions of arms 8 which are pivotally mounted upon studs 9 upon the sides of the frame.

The warp beam 5 is driven by the usual drum 10, the shaft 11 of which is journalled in the sides 1 of the frame. The drum 10, as illustrated, is provided at one end with an internal gear 12 which engages a pinion 13 upon a shaft 14, the opposite end of which is provided with a gear 15 which meshes with a gear 16 upon the main driving shaft 17 which is mounted at one end in a bearing in the side 1 of the frame and at its opposite end in a boss 18 of a bracket 19, which is secured to the sides 1 of the frame.

The driving shaft has the usual tight and loose pulleys 20, 21 for the driving belt and suitable mechanism, (not shown) is provided for shipping the belt from the loose to the tight pulley, and vice versa.

It will thus be obvious that when the main driving shaft 17 is rotated, proper rotation will be transmitted to the drum 10, which, by frictional engagement with the surface of the warp upon the warp beam, will rotate the same at a constant surface speed in the usual manner.

The gear 16 upon the driving shaft also engages a gear 22 which is fixedly secured upon a counter-shaft 23, the gear 22 also engaging a gear 24 upon a shaft 25 which carries a fly wheel which is so constructed and connected to the shaft as to provide the usual gradual starting and stopping of the mechanism.

The shaft 25 is journalled at one end in a boss 26 in a bracket 27 secured to the side 1 of the frame and at its opposite end in a bracket 28 carried by a stand 29 rising from the transverse girder 2.

The parts thus described are those usual in warp beaming machines.

The present invention relates to the mechanism for imposing and maintaining a uniform degree of tension upon the warp or other material which is wound upon the beam.

As illustrated herein the warps 30 pass between the dents in the usual reed 32 which is supported at the upper end of the frame and travel thence over a guide roller 33 and beneath the controller which as illustrated is in the form of a cylinder 34 carried by a shaft 35 journalled in the sides 1 of the frame. The warps 30 after passing around the tension controlling cylinder 34 pass over guide rollers 33$^{x}$ and 36 to the warp beam.

The warp 30 carries, or is engaged by, the usual drop wires 37 which are positioned between the guide rollers 33$^{x}$ and 36 and serve, upon the breakage of any of the warps, to actuate the usual stop mechanism (not shown).

The guide rollers 33 and 33$^{x}$ are mounted in brackets 38 which are secured to the upper ends of the sides 1 of the frame and preferably are so spaced apart that the warps 30 are caused to engage more than 180 degrees of the surface of the tension controlling cylinder 34.

Means are provided for continuously rotating the tension controlling cylinder 34, said means, however, being provided with regulating mechanism which is automatically operable to cause the controller 34 to rotate at such a speed as will maintain a constant predetermined tension upon the section of the warps between said controller and the beam upon which the warps are wound.

The preferred form of driving mechanism illustrated herein comprises a differential gear which desirably is in the form of an epicyclic beveled train. The driving mechanism for the controller 34 illustrated in the drawing comprises a beveled gear 40 which is fixedly secured to a shaft 35 of the controller and engages a beveled gear 41 upon the end of the shaft 42 which is journalled in suitable brackets 43 and 44 secured to the side 1 of the frame.

The shaft 42 is provided at its opposite end with a beveled gear 45 which engages a gear 46, the hub 47 of which is rotatably mounted upon the shaft 23. The shaft 23 is, as above described, driven from the main shaft 17 through the gears 16 and 22.

A second gear 48 is mounted upon the

TEXTILES.

36 shaft 23 and has its hub 49 fixedly secured to the shaft 23 by a pin 50, or other suitable fastening. The gear 48 engages a gear 51 of the epicyclic train which is rotatably secured upon a shaft 52 which is journalled at its ends in bosses 53 and 54 in a U-shaped bracket 55 which rises from the transverse girder 2.

The gear 51 is provided with a bridge 56 extending diametrically across the same, which carries journals 57 and 58 for shafts of beveled idle gears 59 and 60, the axes of which are parallel to a diameter of the gear 51. The idle gears 59 and 60 engage at diametrically opposite points a gear 61 upon the shaft 52 which carries a brake drum 63 and a beveled gear 64, the hub 65 of which is rotatably mounted upon the shaft 52. The hub 65 also is provided with a gear 66 which meshes with a gear 67 which is formed integral with, or secured to, the hub 47 of the gear 46.

The braking mechanism for controlling the action of the epicyclic train comprises a strap 68 which is fixedly secured at one end to a stud 69 at the end of an arm 70 projecting from the bracket 71 which is mounted upon the transverse girder 2. The opposite end of the brake strap 68 is secured to a pin or stud 72 projecting from the intermediate portion of a lever 73 which is fulcrumed upon a stud 74 on the girder 2 and is provided at its opposite end with a slidably adjusted weight 75 which may be moved toward and from the stud 74 of the lever 73 to vary the tension upon the brake strap 68.

In the operation of the machine a tension is placed upon the brake band which, when the tension controller is driven at such a speed as to maintain a predetermined tension upon the strand or sheet, will cause the gears 59 and 60 to have a planetary movement about the axis of the gear 51, the gear 61 rotating at a slower speed than the gear 64.

If a yarn having a greater amount of stretch is to be beamed, the rotation of the controller will necessarily be slower to compensate for the amount of stretch in the yarn, in order that the same may be wound at an even tension upon the beam which is revolving at a predetermined constant surface speed. This compensation is effected by the action of the brake band 68 upon the drum 63 which causes the gear 61 to rotate more rapidly, therefore, requiring a larger number of planetary movements of the uniformly driven gear 51 to drive the gear 64 which actuates the train of gears 66, 67, 46, 45 and 41 which transmits motion to the gear 40 on the shaft of the controller.

Under such circumstances a portion of the power delivered from the main driving shaft through the counter-shaft 23 and gear 48 to the gear 51 is partially absorbed by the brake band, while the remainder and reduced portion is utilized to rotate the controller.

It will, therefore, be obvious that the speed of rotation of the controller is responsive to, and dependent upon, the variation in the amount of stretch of the strand or sheet which it controls and the amount of tension imposed upon the strand or sheet running from the controller to the warp beam or other winding apparatus is maintained constant.

It will be understood that various other mechanisms may be employed for accomplishing this purpose within the spirit and scope of the following claims.

It will also be understood that the controller mechanism disclosed herein, both broadly and specifically, is adapted for various other uses than in warp beaming machines and that the following claims are intended to cover all of the various uses to which this invention may be appropriated.

Having thus described my invention, what I claim as new and desire to secure by Letters Patent, is:

1. A warp beaming machine comprising a warp receiving beam and means for rotating the same at a constant surface speed, a rotatable controller engaging the warp in advance of said warp receiving beam, means for continuously driving said controller and automatically operable means for regulating the speed of rotation of said controller to maintain a constant tension upon the warp between said controller and said beam.

2. A warp beaming machine comprising a warp receiving beam and means for rotating the same at a constant surface speed, a rotatable controller engaging the warp in advance of said warp receiving beam, means for continuously driving said controller automatically operable means for regulating the speed of rotation of said controller and means for adjusting said regulating means whereby dierent degrees of tension may be applied to the warp being wound upon said beam.

3. A warp beaming machine comprising a warp receiving beam and means for rotating the same at a constant surface speed, a rotatable controller engaging the warp in advance of said warp receiving beam, means for continuously driving said controller and adjustable frictional mechanism for regulating said controller driving means whereby different degrees of tension may be applied to the warp being wound upon said beam.

4. A warp beaming machine comprising a warp receiving beam and means for rotating the same at a constant surface speed, a rotatable controller engaging the warp in advance of said warp receiving beam, means including differential gearing for driving said controller and means for regulating the action of said differential gearing to maintain a constant tension upon the warps between said controller and said beam.

5. A warp beaming machine comprising a warp receiving beam and means for rotating the same at a constant surface speed, a rotatable controller engaging the warp in advance of said warp receiving beam, means including an epicyclic train of beveled gears for driving said controller and frictional means for regulating the speed of rotation transmitted through said epicyclic train to said controller.

6. A warp beaming machine comprising a warp receiving beam and means for rotating the same at a constant surface speed, a rotatable controller engaging the warp in advance of said warp receiving beam, means including an epicyclic train of beveled gears for driving said controller, a brake applied to one of the gears of said train and means for adjusting said brake whereby the speed of rotation transmitted through said epicyclic train to said controller may be regulated.

7. A yarn winding machine comprising a rotatable yarn receiver and means for rotating the same, a controller engaging the yarn in advance of said yarn receiver, means for continuously driving said controller, and means automatically operable by variations in the tension upon the yarn to regulate the speed of rotation of said controller whereby a constant tension will be maintained upon the yarn wound upon said yarn receiver.

8. A yarn winding machine comprising a rotatable yarn receiver and means for rotating the same, a controller engaging the yarn in advance of said yarn receiver, means for continuously driving said controller, automatically operable means for regulating the speed of rotation of said controller and means for adjusting said regulating means to vary the degree of tension upon the yarn wound upon said yarn receiver.

9. A machine comprising means for drawing a sheet of material at a constant rate of speed, a tension controlling cylinder engaging said sheet in advance of said sheet drawing means, means for continuously rotating said controlling cylinder and automatically operable means for regulating the speed of rotation of said controlling cylinder to maintain a constant tension upon said sheet between said controlling cylinder and said sheet drawing means.

10. A machine comprising means for drawing a sheet of material at a constant rate of speed, a tension controlling cylinder engaging said sheet in advance of said sheet drawing means, means for continuously rotating said controlling cylinder including differential gearing and braking means for regulating the speed of rotation transmitted to said cylinder through said differential gearing operable by variation in tension upon said sheet to maintain a constant tension upon the portion of the sheet engaged by said sheet drawing means.

In testimony whereof, I have signed my name to this specification.

ALONZO E. RHOADES.